United States Patent Office 3,274,915
Patented Sept. 27, 1966

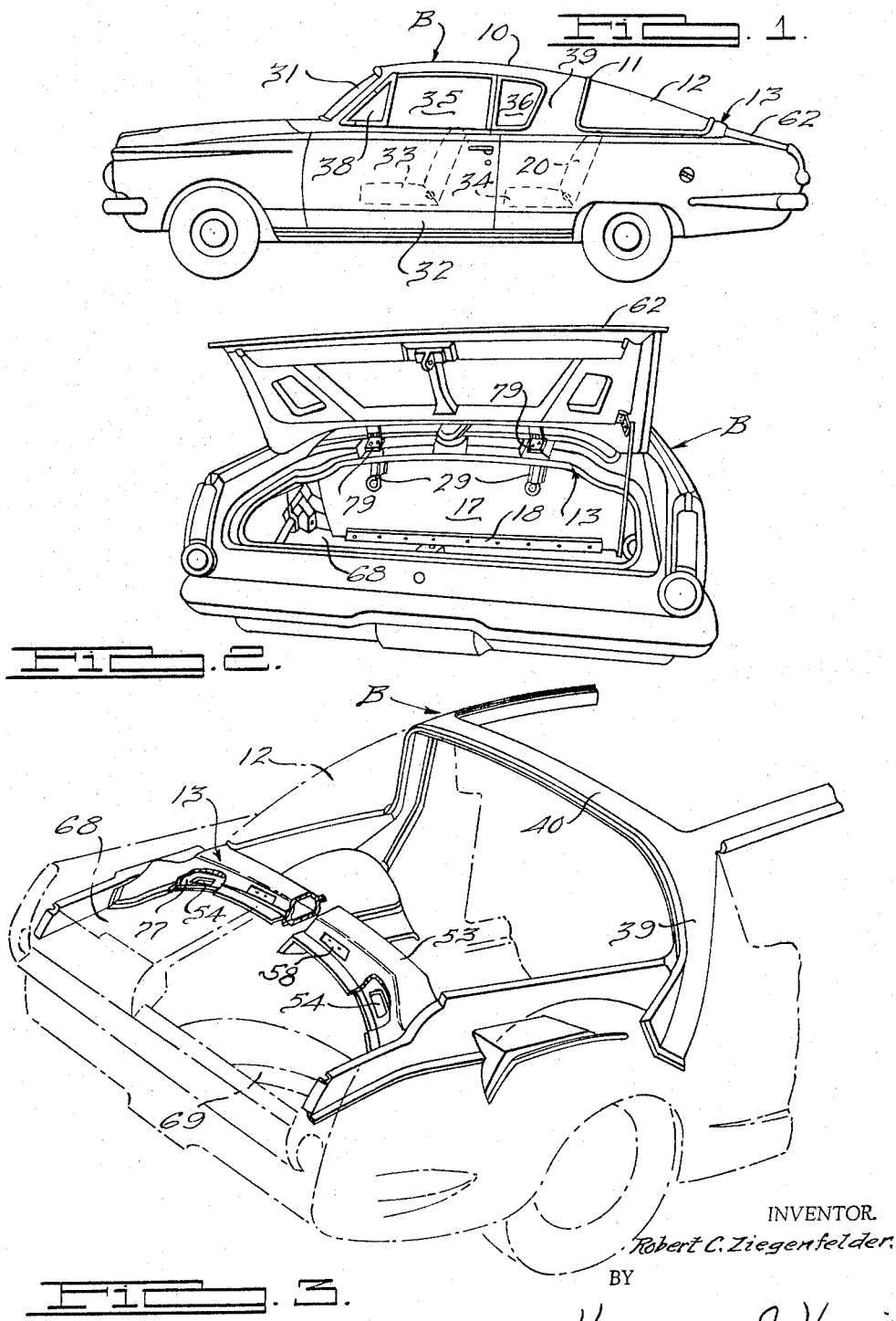

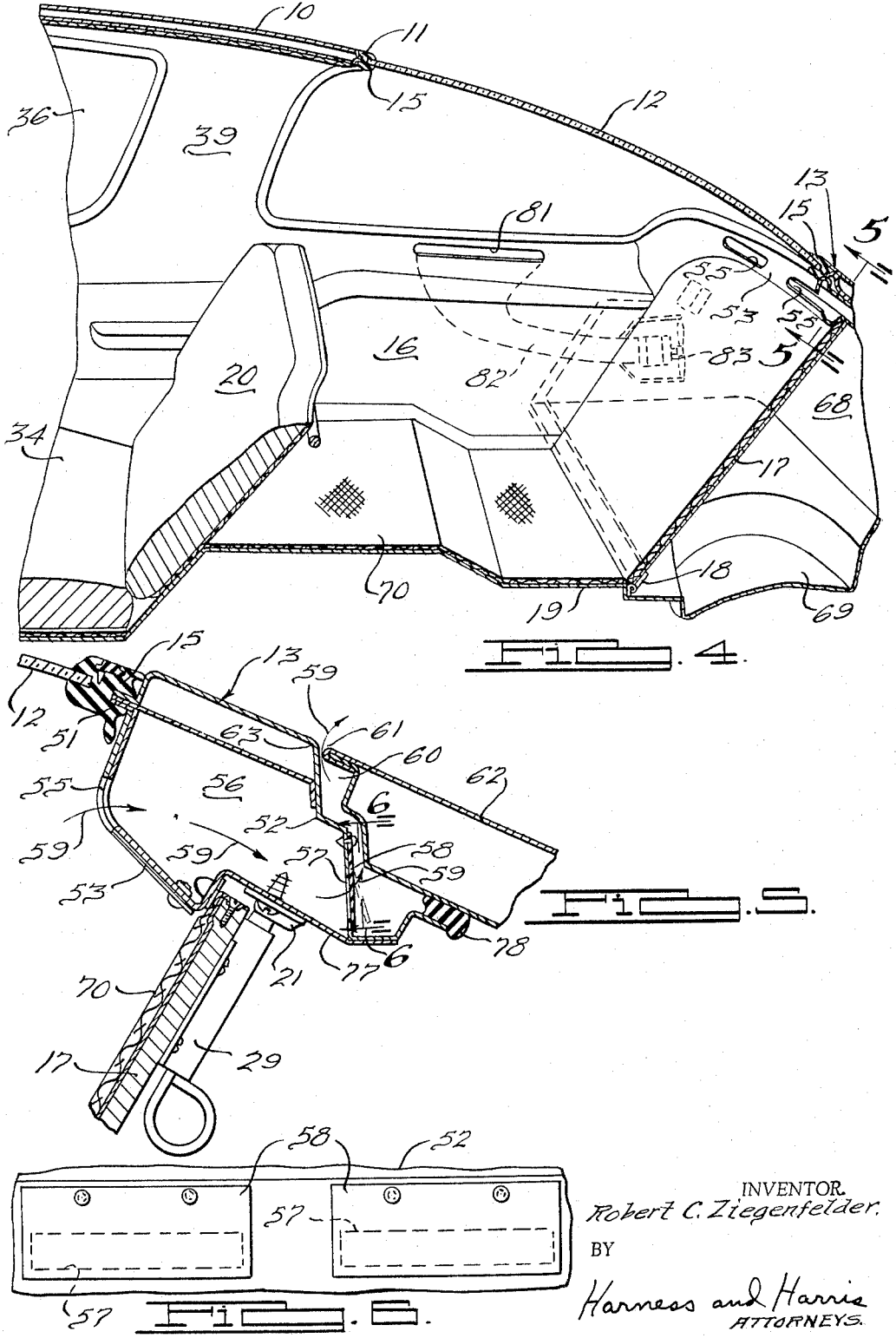

3,274,915
VEHICLE BODY INTERIOR VENTILATION
ARRANGEMENT
Robert C. Ziegenfelder, Warren, Mich., assignor to
Chrysler Corporation, Highland Park, Mich., a corporation of Delaware
Filed July 24, 1964, Ser. No. 384,839
5 Claims. (Cl. 98—2)

This invention relates to a vehicle body and particularly to a unique arrangement for ventilating the vehicle body interior, and improving the operation of the body interior heating and/or air conditioning equipment. This body ventilation control will also reduce window fogging and/or eliminate moisture dripping from the large, substantially horizontally extending, rear window.

The dual purpose vehicle herein disclosed has the exterior lines of a sports car, without the interior restrictions that often characterize a car of this type. It will seat five passengers with ease. Versatility is provided by a spacious rear utility compartment that is generally designated by the reference numeral 16. Its exterior styling is dominated by a fast-back design (see FIGS. 1 and 4) in which the roof line blends together with an extra large rear window 12 to form a continuous arc from the windshield rearwardly and downwardly to the trunk compartment.

Beneath the vast expanse of the rear window glass is the large, functionally designed utility area 16 (see FIG. 4). Notably absent is a package shelf. Instead, there is a flat, carpeted floor which can be extended to a seven-foot length by folding the rear seat back 20 forwardly to a horizontal position and dropping the hinged security panel 17 rearwardly to a horizontal position. The hinged security panel 17, when latched in its upstanding position (FIG. 4), angles upwardly to fit snugly beneath the rear window rear garnish beam 53. Panel 17 is called a security panel because the latch means 29 therefor is operable only from within the trunk compartment 68 (see FIG. 2). When the security panel 17 is latched in its upstanding position the contents of the trunk compartment 68 are effectively sealed off from the interior passenger compartment of the vehicle. When unlatched, the panel 17 is folded rearwardly into the trunk where it seats flat over the concealed tire well 69.

The prime innovation in the utility area 16 is associated with the plurality of rectangular airflow slots 55 at the base of the rear window 12 (see FIG. 4). These slots 55 are used to exhaust the passenger compartment air, funneling it into a special garnish beam chamber 56 from which it is allowed to escape into the atmosphere through valved openings 57 as hereinafter described. By promoting this flow of air from the front to rear of the passenger compartment, there is a better airflow to the rear seat passengers, the large rear window 12 normally is kept clear of fog or moisture, the reduced interior pressure improves the operation and efficiency of the interior heater or air conditioning system, and conditioned or heated air during cold months is efficiently transferred throughout the car interior without opening any of the vehicle windows. In addition, because of the valved openings 57, the back pressure within the body interior is reduced and door closing can be accomplished with less effort.

Inasmuch as the usual diagonal braces and rear seat shelf panel structure are eliminated by the utility compartment 16 behind the rear seat, a network of specially designed structural members (see FIG. 3) makes up the body structure surrounding the rear window 12 to provide the necessary body torsional rigidity. Of primary importance is the arch or truss member 13, a reinforced box section, that extends transversely of and is anchored to the body sides and forms the supporting structure for the rear edge portion of the rear window 12. In addition to supporting the lower part of the rear window glass 12 the arch 13 takes up the load from the rear deck hinging and also serves as a body interior air exhaust duct as will be explained.

It is a prime object of this invention to provide a novel arrangement for improved heating and ventilating the interior of a vehicle body and to particularly include improved means to clear and defog a large rear window area such as the rear window of a fast back type vehicle.

It is still another object of this invention to provide a novel rear window structural supporting beam or arch that includes suitable vehicle body interior air exhaust conduit structure such that the back pressure within the closed vehicle body will be sufficiently low to give improved interior heating and ventilating and, in addition, provide improved sealing between the windlace strips surrounding all window and door openings and the adjacent windows and doors. This reduced back pressure also acts to reduce the effort required to close the vehicle doors.

Other objects and advantages of this invention will be readily apparent from a reading of the following description and a consideration of the related drawings wherein:

FIGURE 1 is a side elevation of a two door, hardtop, fast back motor vehicle embodying this invention;

FIGURE 2 is a fragmentary perspective view of the rear end of the vehicle body shown in FIGURE 1, wherein the trunk lid is shown in open or elevated position;

FIGURE 3 is another fragmentary perspective view of the vehicle body shown in FIGURE 1 with portions thereof broken away and shown in section or by broken line so as to more clearly bring out certain body structural elements and arrangements that contribute materially to the invention embodied in this vehicle;

FIGURE 4 is an enlarged fragmentary sectional elevational view extending longitudinally of the vehicle body shown in FIGURES 1 through 3 and disclosing the interior of the vehicle body with the second seat and the security panel in raised or erected positions;

FIGURE 5 is an enlarged fragmentary sectional elevational view showing the hollow garnish beam body structural element at the rear edge of the vehicle body rear window, this view being taken along the line of and in the direction of the arrows 5—5 applied to FIGURE 4; and FIGURE 6 is another enlarged fragmentary sectional elevational view showing the one-way valve mechanism in the hollow garnish beam member, this view being taken along the line of and in the direction of the arrows 6—6 applied to FIGURE 5.

As previously indicated the several inventions included in this application are shown associated with a so-called fast back vehicle body of the two door hardtop type. However, the ventilation control arrangement specifically disclosed and claimed herein is adapted to be applied to any style body and therefore this invention is to be limited only by the claims and not by the specific body form disclosed.

FIG. 1 shows a so-called two door, fast back vehicle body B wherein the rearwardly and downwardly sloping hardtop roof 10 extends from the top of the windshield 31 to the enlarged rear window 12. The rear edge 11 of the roof 10 is preferably rearwardly of the body second seat back 20 (see FIG. 4) so that the passengers on the second seat 34 will be shielded from the sun by the overlying opaque roof 10. The large single doors 32 on each side of the vehicle body B permit easy access to the vehicle front seats 33 which may be individually adjustable bucket seats or a bench type seat with a pivoted back section. Also the large doors 32 and pivoted front seat backs permit easy access to the second or rear seat 34.

From FIGS. 1 and 4 it is also obvious that maximum visibility is provided for all passengers of the disclosed type of vehicle because of the novel window arrangement. There is no "B" post or middle post located between the rear edge of the vertically adjustable door window 35 and the vertically adjustable quarter panel window 36. A trim sealing channel 37 may be mounted to extend along the rear vertical edge of the door window 36 to sealingly engage the forward vertical edge of the quarter panel window 36. Obviously when the door window 35 is lowered then the edge seal 37 is lowered into the door 32 such that it cannot provide an obstruction to vision from within the vehicle body. The front doors 32 each include the usual pivotally mounted, adjustable vent windows 38. Rearwardly of each of the quarter panel windows 36 is a "C" post or rear post 39. The side "C" posts 39 (see FIG. 3) provide the legs of the inverted U-shaped roof truss or beam 40. Beam 40 cooperates with the garnish beam 13 located rearwardly of and beneath the beam 40 to provide the major support for the large rearwardly and downwardly sloping rear window 12. Window 12 is preferably of heat absorbing glass or some similar transparent material.

Looking now at FIGS. 1 through 4 in particular, it will be noted that vehicle body B includes a rearwardly and downwardly sloping arcuate roof section 10 that terminates at its rear edge 11 where the roof arc blends into a large rear window section 12. The rear window 12 is of substantially an inverted U-shape in cross sectional configuration and it tapers rearwardly and downwardly to the garnish beam rear window support member 13. Suitable resilient window mounting seal strips 15 connect the rear window glass 12 to the surrounding vehicle body structure. There is no body shelf member or diagonal structural body bracing located at the rear or beneath the rear edge of the rear window 12 such as is usually the case with conventional vehicle body designs. It is apparent, particularly from FIG. 4, that the rear window 12 overlies the utility storage area that is generally designated by the reference numeral 16. At the front of the utility area 16 is the foldable second seat back 20 that normally provides an upstanding front wall element for the utility area. At the rear of the utility area 16 is the security panel 17 that normally provides an upstanding rear wall for this area. The security panel 17 is hingedly connected at 18 (see FIGS. 2 and 4) to the rear edge portion of the kick-up floor 19. A latch means 29 (see FIGS. 2 and 5) is provided at one or more locations along the upper edge of the security panel 17 so that the security panel may be latched to keeper members 21 carried by the garnish beam member 13.

The upper or exposed face of the security panel 17, the top face of the kick-up floor section 19 and the rear side of the second seat back 20 are all preferably covered with carpeting material 70 such that when the rear seat back 20 and the security panel 17 are lowered to substantially horizontal positions, there is a continuously carpeted, relatively long, floor area that extends from the rear side of the front seat 33 to the rear end of the vehicle.

Looking now at FIGS. 3 and 4 it will be noted that the specific body structure disclosed eliminates the shelf panel that is usually positioned adjacent the lower edge of the vehicle body rear window. Not only is the shelf member eliminated but also there are no vertical structural braces or panels extending from the garnish molding beam 13 to the floor section beneath the beam 13. This entire area is kept free of structural members so that the security panel 17 can have unimpaired swinging movement between its erect and horizontal positions. Also it is desired to have a clear maximum size opening between the utility area 16 and the trunk area 68 when the security panel 17 is lowered.

In this vehicle body it will be noted the lower rear edge of the rear window 12 (see FIG. 5) is mounted in a resilient sealing strip 15 carried by a fence portion 51 that forms a part of the garnish molding beam 13. This transversely extending garnish beam 13 is a hollow box section and it is utilized not only as a major structural member to rigidify the rear end portion of the vehicle body, but, in addition, beam 13 provides a hollow air flow conduit that facilitates the heating and ventilation of the vehicle body interior. This conduit beam 13 also facilitates cleaning and defogging of the relatively large rear window 12. As can be noted from FIGS. 4 and 5, the interior garnish rail front wall portion 53 of beam 13, that extends along the interior lower edge of the rear window 12, is pierced by a plurality of elongated slot-like openings or ports 55. These slots 55 permit air, that is being circulated within the vehicle body, to be exhausted from the body interior to the conduit chamber 56 that is formed by the hollow interior of the garnish beam 13. The air passing into the conduit chamber 56 can pass through the one-way valve controlled exhaust ports or slots 57 formed in the rear wall 52 of the garnish beam 13 because these slots 57 are controlled by one-way rubber flap valve plates 58. Air following the path of the arrows 59 will be exhausted to the atmosphere through the space 60 that extends between the upper edge 61 of the trunk lid 62 and the spaced adjacent edge 63 of the garnish beam 13. It has been found that not only does the arrangement of the exhaust slots 55 provide a means that prevents fogging and moisture dripping from the large rear window 12, due to the air circulation thereacross, but, in addition, exhaust ports 55, 57 tend to reduce the back pressure within the vehicle body so that air circulation across the car heater coils (not shown) is increased and there is a more efficient and faster heat transfer in the car heating system. Air circulation from the front of the body interior to the rear portion thereof is also materially improved. Because of the one-way flaps 58 it is believed to be obvious that smoke, dust and similar foreign gases exteriorly of the vehicle cannot bleed back into the vehicle interior from the atmosphere when the pressure within the vehicle body is reduced. Valve flaps 58 are also effective to provide a means opposing noise transfer to the vehicle interior through slots 55.

The significant improvement in heating and ventilating of the vehicle body interior, as a result of the incorporation of the valved exhaust slots 55, is believed to be graphically pointed out by the following chart that sets forth the results of tests run on a vehicle body of the disclosed type. This chart shows the comparison of the air flow when the disclosed exhauster system is used and when it is not incorporated in the disclosed type of vehicle body.

HEATER AND EXHAUSTER FLOWS AND CAR PRESSURES

[Car Windows Closed, Heater Blower on High]

|  | Heater c.f.m. at given m.p.h. | | | | Exhauster c.f.m. at given m.p.h. | | | | Interior Car Pressure at given m.p.h. ("H₂O) | | | |
| --- | --- | --- | --- | --- | --- | --- | --- | --- | --- | --- | --- | --- |
|  | 0 | 20 | 60 | 80 | 0 | 20 | 60 | 80 | 0 | 20 | 60 | 80 |
| With Exhauster | 144 | 165 | 190 | 210 | 82 | 84 | 95 | 104 | +.24 | +.19 | +.05 | −.05 |
| Without Exhauster | 130 | 145 | 168 |  | 0 | 0 | 0 | 0 | +.4 | +.38 | +.26 | +.15 |

[Car Windows Closed, Ram Heat Operation]

| With Exhauster | 0 | 30 | 112 | 160 | 0 | 4 | 48 | 69 | 0 | −.05 | −.15 | −.25 |
| --- | --- | --- | --- | --- | --- | --- | --- | --- | --- | --- | --- | --- |
| Without Exhauster | 0 | 22 | 98 | 135 | 0 | 0 | 0 | 0 | 0 | −.05 | −.15 | −.25 |

In addition to providing improved interior air flow without opening of windows, improved heater and/or air conditioner efficiency because of reduced back pressure, better air circulation to the rear seat passengers, reduced interior pressure for easier and better door sealing, and improved window defogging and moisture removal, the disclosed body ventilation plan also lends itself to easier deck or trunk lid closing. Looking at FIGS. 3 and 4, it will be noted that the opposite ends of the hollow garnish beam member 13 can be pierced by openings or slots 54 if desired. These slots 54 are not necessary for the aforedescribed interior ventilation system but they can be provided to cooperate with the previously described system and facilitate easier deck lid closing. When the deck lid 62 (see FIG. 2) is swung downwardly to a closed position it traps air in the trunk compartment 68 and tends to compress this air. The compression of the air exerts a reaction against deck lid closing such that more operator effort may be required. By piercing openings 54 in the lower side or wall 77 of the garnish beam 13, the air trapped in the trunk compartment 68 can escape through the openings 54, the hollow conduit 56 and pass outwardly to the surrounding atmosphere through the valved slots 57 as indicated by the arrows 59 in FIG. 5. Thus it will be seen that the novel ventilation duct 13 serves a dual function, namely, to improve body passenger area ventilation and air control and also to reduce deck lid closing effort.

To accommodate increased forced fresh air circulating across the large rear window 12, provision is made (see FIG. 4) for the mounting of a separate electric motor driven fan unit 83 in the trunk area 68. This fan 83 is connected by a flexible or rigid conduit 82 to the elongated slot 81 in the body interior wall portion that extends along the lower side edge of the rear window 12. The slots 81 on the opposite side of the vehicle (not shown) would normally serve as an exhaust slot for the air passed across the inside of the window 12 by the action of fan 83. Slots 81 may be formed with knock out plug covers to keep the body interior better sealed if a circulation fan 83 is not required.

The garnish beam 13 (see FIG. 2) that mounts the lower rear edge of the rear window 12 and provides structural bracing for the rear end sheet metal of the body B also serves as the mounting bar for the trunk lid 62. From FIG. 2 it is clear that beam 13 mounts a pair of strap hinges 79 that each have one leaf bolted to the beam 13 and the other leaf bolted to the trunk lid 62. A suitable sealing strip 78 (see FIG. 5) is compressively engaged between the trunk lid 62 and the beam 13.

I claim:

1. In a vehicle body having an opaque roof section overlying the passenger seating area and a large transparent window panel positioned rearwardly of the seating area, said window panel extending rearwardly and downwardly from said opaque roof section and a trunk area positioned rearwardly of said window panel, a hollow beam member extending transversely of the vehicle body at the rear end of said window panel and supporting same, ventilation ports in portions of said beam member opening into the body interior and other ports in said beam members opening to the atmosphere having valving associated therewith to control the exhaust of air from the body interior across the interior side of said window panel, through the hollow beam member, and outwardly to the atmosphere, an upstanding panel member mounted across the body interior beneath said window to separate the passenger area from the trunk area of the body, and other openings in said hollow beam member opening into said trunk area to provide for exhaust of air from said trunk area through said valved other ports in said hollow beam member.

2. In a vehicle body as set forth in claim 1 wherein a power driven fan means is located in said trunk area and connected by conduit means to the passenger area adjacent said window panel whereby air can be recirculated between said trunk area and said passenger area across said window panel interior side surface.

3. In a vehicle body having a roof overlying the passenger area and a rear window extending transversely of and downwardly from the roof at the rear end of said passenger area, a hollow beam member of box-like cross section extending transversely of the vehicle body and located rearwardly of and providing the means supporting the lower edge of said rear window, the front wall of said hollow beam member having inlet ports therein opening directly into the vehicle passenger area and the rear wall of said hollow beam member having exhaust ports therein communicating with the atmosphere, and valve means associated with said exhaust ports to control air flow therethrough from the passenger area to the atmosphere.

4. In a vehicle body having a roof overlying the passenger area and a rear window extending transversely of and downwardly from the roof at the rear end of said passenger area, a hollow beam member of box-like cross section extending transversely of the vehicle body and located rearwardly of and providing the means supporting the lower edge of said rear window, the front wall of said hollow beam member having inlet ports therein directly opening into the vehicle passenger area and the rear wall of said hollow beam member having exhaust ports therein communicating with the atmosphere, and valve means associated with said exhaust ports to control air flow therethrough from the passenger area to the atmosphere, said valve means comprising one-way opening, vertically disposed, flap valves that resist backflow from the atmosphere through said hollow beam member to said vehicle passenger area.

5. In a vehicle body having a roof overlying the passenger area and a rear window extending transversely of and downwardly from the roof at the rear end of said passenger area, a hollow beam member of box-like cross section extending transversely of the vehicle body and supporting the lower edge of said rear window, the front wall of said hollow beam member having inlet ports therein opening into the vehicle passenger area and the rear wall of said hollow beam member having exhaust ports therein communicating with the atmosphere, and valve means associated with said exhaust ports to control air flow therethrough from the passenger area to the atmosphere, said hollow beam member having a trunk lid hingedly connected thereto and arranged so that portions thereof are spaced from but normally shield the exhaust ports from view.

References Cited by the Examiner

UNITED STATES PATENTS

| | | | |
|---|---|---|---|
| 2,761,370 | 9/1956 | Rhoades | 98—2 |
| 3,143,951 | 8/1964 | Watt | 98—2 |

FOREIGN PATENTS 216,370    7/1961    Austria.

MEYER PERLIN, *Primary Examiner.*